(12) United States Patent
Mise et al.

(10) Patent No.: US 9,612,586 B2
(45) Date of Patent: Apr. 4, 2017

(54) ENERGY MANAGEMENT APPARATUS AND ENERGY MANAGEMENT SYSTEM

(71) Applicant: Panasonic Corporation, Kadoma-shi, Osaka (JP)

(72) Inventors: Atsushi Mise, Aichi (JP); Kiyotaka Takehara, Nara (JP); Yoshihiko Tokunaga, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 527 days.

(21) Appl. No.: 14/054,948

(22) Filed: Oct. 16, 2013

(65) Prior Publication Data

US 2014/0046496 A1 Feb. 13, 2014

Related U.S. Application Data

(63) Continuation of application No. PCT/JP2012/060774, filed on Apr. 20, 2012.

(30) Foreign Application Priority Data

Apr. 21, 2011 (JP) .................................. 2011-094917

(51) Int. Cl.
G05B 15/02 (2006.01)
G06Q 10/06 (2012.01)
G06Q 50/06 (2012.01)

(52) U.S. Cl.
CPC ............. *G05B 15/02* (2013.01); *G06Q 10/06* (2013.01); *G06Q 50/06* (2013.01)

(58) Field of Classification Search
CPC ......... G05B 15/02; G06Q 50/06; G06Q 10/06
See application file for complete search history.

(56) References Cited

U.S. PATENT DOCUMENTS

2003/0101009 A1* 5/2003 Seem .................. H02J 3/00 702/61
2004/0117330 A1* 6/2004 Ehlers .............. F24F 11/0012 705/412

(Continued)

FOREIGN PATENT DOCUMENTS

EP 1309062 A2 5/2003
JP H09-217953 A 8/1997

(Continued)

OTHER PUBLICATIONS

International Search Report for PCT/JP2012/060774.
European Search Report dated Jul. 24, 2014 issued for the corresponding European patent application No. 12774816.8.

*Primary Examiner* — Ramesh Patel
(74) *Attorney, Agent, or Firm* — Mots Law, PLLC

(57) ABSTRACT

An energy management apparatus includes: algorithm storage unit configured to store at least one energy-saving control algorithm; controller configured to control an operation of controlled device by executing the algorithm and; data storage unit configured to store reduction information corresponding to the algorithm, the reduction information used to figure out a reduction in energy consumption due to the execution of the algorithm; estimation unit configured to estimate the reduction in the energy consumption due to the execution of the algorithm on the basis of the reduction information, when controller controls the operation of controlled device by executing the algorithm; and network communication unit configured to output the estimation result.

21 Claims, 13 Drawing Sheets

(56) References Cited

U.S. PATENT DOCUMENTS

| | | | |
|---|---|---|---|
| 2006/0276938 A1* | 12/2006 | Miller | G06Q 50/06 700/295 |
| 2007/0239317 A1* | 10/2007 | Bogolea | B60H 1/0065 700/276 |
| 2008/0082183 A1* | 4/2008 | Judge | G05B 15/02 700/33 |
| 2010/0063644 A1* | 3/2010 | Kansal | G06Q 30/02 700/295 |
| 2010/0241287 A1 | 9/2010 | Nishino et al. | |
| 2011/0061015 A1* | 3/2011 | Drees | G05B 15/02 715/771 |
| 2011/0185196 A1* | 7/2011 | Asano | B60L 11/1809 713/300 |
| 2012/0215369 A1* | 8/2012 | Desai | G06Q 10/06 700/291 |
| 2012/0247748 A1 | 10/2012 | Mise et al. | |

FOREIGN PATENT DOCUMENTS

| | | |
|---|---|---|
| JP | 2002-202998 A | 7/2002 |
| JP | 2002-278604 A | 9/2002 |
| JP | 2009-115359 A | 9/2002 |
| JP | 2002-327947 A | 11/2002 |
| JP | 2004-118366 A | 4/2004 |
| JP | 2009-259125 A | 11/2009 |
| JP | 2011-034484 A | 2/2011 |
| JP | 2011-058753 A | 3/2011 |
| WO | 2009/148122 A1 | 12/2009 |
| WO | 2011/029137 A1 | 3/2011 |

* cited by examiner

FIG. 6

| TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TOTAL/DAY |
|---|---|---|---|---|---|---|---|---|---|---|---|---|---|---|---|---|---|---|---|---|---|---|---|---|---|
| TOTAL CONSUMED-POWER AMOUNT [kWh] | 0.7 | 0.5 | 0.5 | 0.5 | 0.5 | 0.6 | 3.7 | 1.6 | 0.7 | 0.5 | 0.4 | 0.3 | 1.0 | 0.5 | 0.1 | 0.1 | 1.3 | 1.7 | 1.3 | 1.2 | 1.3 | 0.7 | 0.8 | 0.5 | 21.0 kWh |
| EXECUTION DURATION — SECOND ALGORITHM M1 | | | | | | | ● | ● | ● | ● | | | | | | | | | | | | | | | 4 HOURS |
| EXECUTION DURATION — SECOND ALGORITHM M2 | | | | | | | | | ● | | | | | | | | | | | | | | | | 1 HOUR |
| EXECUTION DURATION — SECOND ALGORITHM M3 | | | | | | | | | | | | | | | | ● | ● | ● | ● | | | | | | 4 HOURS |
| EXECUTION DURATION — SECOND ALGORITHM M4 | | | | | | | | ● | ● | ● | ● | ● | ● | ● | ● | | | | | | | | | | 8 HOURS |

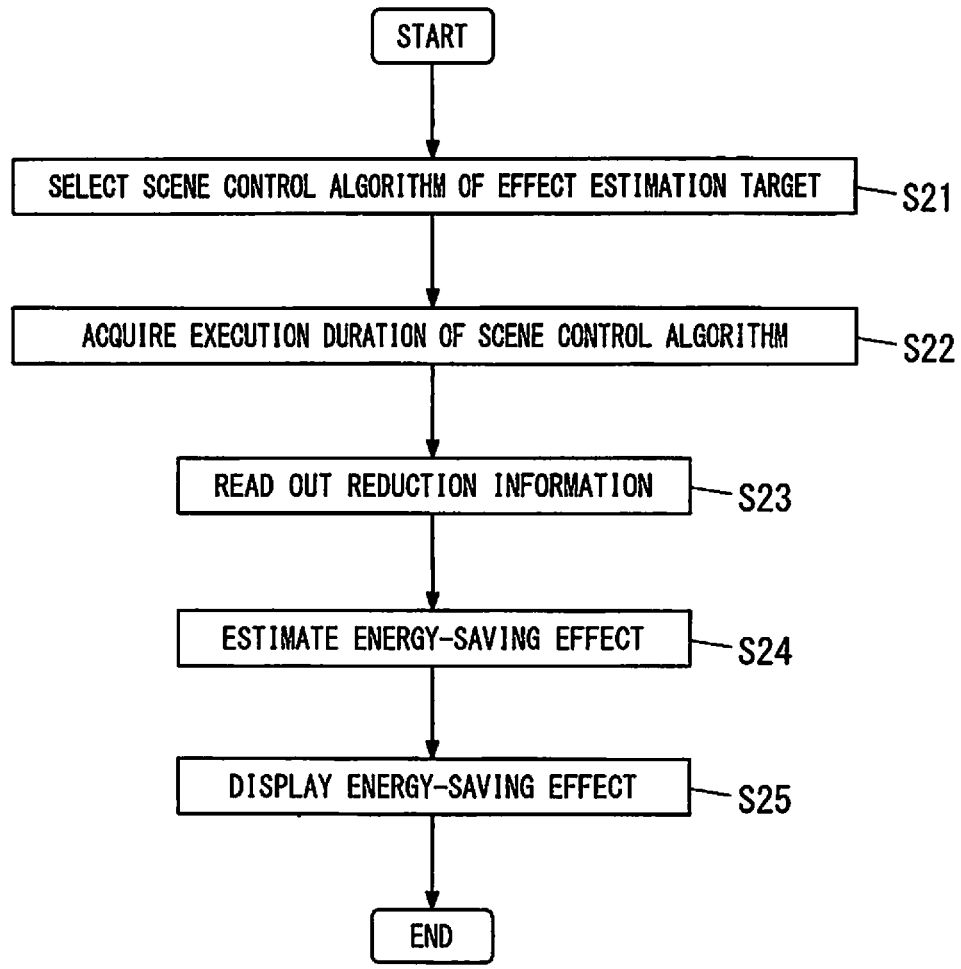

FIG. 9

| TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TOTAL/DAY |
|---|---|---|---|---|---|---|---|---|---|---|---|---|---|---|---|---|---|---|---|---|---|---|---|---|---|
| TOTAL CONSUMED-POWER AMOUNT [kWh] | 0.7 | 0.5 | 0.5 | 0.5 | 0.5 | 0.6 | 3.7 | 1.6 | 0.7 | 0.5 | 0.4 | 0.3 | 1.0 | 0.5 | 0.1 | 0.1 | 1.3 | 1.7 | 1.3 | 1.2 | 1.3 | 0.7 | 0.8 | 0.5 | 21.0 kWh |
| EXECUTION DURATION — SCENE CONTROL ALGORITHM M11 | ● | ● | ● | ● | ● | ● | ● | | | | | | | | | | | | | | | | ● | | 8 HOURS |
| EXECUTION DURATION — SCENE CONTROL ALGORITHM M12 | | | | | | | | | | | | ● | ● | ● | | | | | | | | | | | 3 HOURS |

FIG. 10

| TIME | HOUR | | 9 | | | | | 10 | | | | | |
|---|---|---|---|---|---|---|---|---|---|---|---|---|---|
| | MINUTE | 10 | 20 | 30 | 40 | 50 | 60 | 10 | 20 | 30 | 40 | 50 | 60 |
| EXECUTION DURATION | SCENE CONTROL ALGORITHM M11 | | | | S | E | | | | | | | |
| | SCENE CONTROL ALGORITHM M12 | | | | | | S | | | E | | | |

TB3

| NAME OF ALGORITHM | REDUCTION INFORMATION K1 | | |
|---|---|---|---|
| | Ta ≦ T1 | T1 < Ta ≦ T2 | T2 < Ta |
| SECOND ALGORITHM M1 | Y1% | Y2% | Y3% |
| SECOND ALGORITHM M2 | ⋮ | ⋮ | ⋮ |
| SECOND ALGORITHM M3 | ⋮ | ⋮ | ⋮ |
| SECOND ALGORITHM M4 | ⋮ | ⋮ | ⋮ |

| NAME OF ALGORITHM | REDUCTION INFORMATION K1 | | |
|---|---|---|---|
| | SUMMER | INTERMEDIATE SEASON | WINTER |
| SECOND ALGORITHM M1 | Y 1 1 % | Y 1 2 % | Y 1 3 % |
| SECOND ALGORITHM M2 | ⋮ | ⋮ | ⋮ |
| SECOND ALGORITHM M3 | ⋮ | ⋮ | ⋮ |
| SECOND ALGORITHM M4 | ⋮ | ⋮ | ⋮ |

| REDUCTION INFORMATION K1 | SUNNY | CLOUDY | RAINY |
|---|---|---|---|
| MORNING | Y 2 1 % | Y 2 2 % | Y 2 3 % |
| DAYTIME | Y 3 1 % | Y 3 2 % | Y 3 3 % |
| NIGHT | Y 4 1 % | Y 4 2 % | Y 4 3 % |

ENERGY MANAGEMENT APPARATUS AND ENERGY MANAGEMENT SYSTEM

CROSS REFERENCE TO RELATED APPLICATIONS

This application is a continuation application of International Application No. PCT/JP2012/060774, filed on Apr. 20, 2012, entitled "ENERGY MANAGEMENT APPARATUS AND ENERGY MANAGEMENT SYSTEM", which claims priority based on Article 8 of Patent Cooperation Treaty from prior Japanese Patent Application No. 2011-094917, filed on Apr. 21, 2011, the entire contents of which are incorporated herein by reference.

BACKGROUND ART

The invention relates to an energy management apparatus and an energy management system, which performs energy-saving control.

Conventionally, in order to decrease the consumed power (energy consumption) of controlled devices such as heaters, air conditioners, and lighting devices in individual houses in collective housing, single-family houses, offices, or the like, there has been a system which performs an energy-saving control (hereinafter, referred to "second control (mode)") that consumes less power than a predetermined output control (hereinafter, referred to "first control (mode)") (for example, refer to Japanese Patent Application Publications Nos. 2011-058753, 2009-115359, and 9-217953). In other words, the first control is a control for controlling each controlled device with predetermined power (for example, rated power) that is larger than the power consumed by the second control.

Various types of second controls have been performed heretofore. In this regard, it is necessary to notify users of an energy-saving effect by the second control in order to encourage the users to take energy-saving actions by emphasizing the merit of the second control. Generally, both data of energy used (energy consumed) under the second control and data of energy consumed under the first control are needed to figure out the effect of the second control.

However, actually, when the second control is performed, energy consumption under the second control can be measured, whereas energy consumption under a non-energy-saving control, i.e., the first control cannot be measured. On the other hand, when the first control is performed, energy consumption under the first control can be measured whereas energy consumption under the energy-saving control, i.e., the second control cannot be measured.

In short, there is a problem that when only one of the first control and the second control is performed, the energy-saving effect by the second control cannot be figured out.

The invention has been made in view of the abovementioned circumstances, and an object of an embodiment of the invention is to provide an energy management apparatus and an energy management system which can figure out an energy-saving effect by an energy-saving control, even when only one of the energy-saving control and a control consuming more energy is performed.

SUMMARY OF THE INVENTION

An aspect of the invention provides an energy management apparatus that includes an algorithm storage unit configured to store at least one energy-saving control algorithm, which controls an operation of a controlled device in a way to reduce energy consumption thereof; a controller configured to control the operation of the controlled device by executing the energy-saving control algorithm; a data storage unit configured to store reduction information corresponding to the energy-saving control algorithm, and used to figure out a reduction in the energy consumption of the controlled device due to the execution of the energy-saving control algorithm; an estimation unit configured to estimate, when the controller controls the operation of the controlled device by executing the energy-saving control algorithm, the reduction in the energy consumption of the controlled device due to the execution of the energy-saving control algorithm on the basis of the reduction information corresponding to the energy-saving control algorithm; and an output unit configured to output an estimation result by the estimation unit.

In one embodiment, the algorithm storage unit is configured to store energy-saving control algorithms each of which controls the operation of the controlled device in a way to reduce the energy consumption thereof. The controller is configured to control the operation of the controlled device by executing the energy-saving control algorithm selected by the algorithm storage unit. The data storage unit is configured to store reduction information corresponding to each of the energy-saving control algorithms, wherein the reduction information is used to figure out a reduction in the energy consumption of the controlled device due to the execution of the corresponding energy-saving control algorithm.

In one embodiment, the estimation unit is configured to acquire an execution duration which is a period when the energy-saving control algorithm is continuously executed, and estimate the reduction in the energy consumption of the controlled device on the basis of the acquired execution duration and the reduction information corresponding to the energy-saving control algorithm.

In one embodiment, the estimation unit is configured to estimate the reduction in the energy consumption of the controlled device in the execution duration when the time length of the execution duration is not less than a lower limit value, and not to estimate the reduction in the energy consumption of the controlled device in the execution duration when the time length of the execution duration is less than the lower limit value.

In one embodiment, the energy management apparatus further includes an update unit. The update unit is configured to update the reduction information corresponding to an executed energy-saving control algorithm and stored in the data storage unit on the basis of measurement results of the energy consumption of the controlled device before and after the controller starts executing of the energy-saving control algorithm.

In one embodiment, the energy management apparatus further includes a time period information acquisition unit. The time period information acquisition unit is configured to acquire time period information on a time period. The data storage unit is configured to store reduction information corresponding to each of the energy-saving control algorithms for every time period. The estimation unit is configured to estimate the reduction in the energy consumption of the controlled device on the basis of the reduction information for the time period information acquired by the time period information acquisition unit.

In one embodiment, the energy management apparatus constitutes an energy management system together with an environment information acquisition unit configured to acquire environment information on a surrounding environment. The data storage unit is configured to store reduction information corresponding to each of the energy-saving control algorithms for every surrounding environment. The estimation unit is configured to estimate the reduction in the energy consumption of the controlled device on the basis of the reduction information for the environment information acquired by the environment information acquisition unit.

In one embodiment, the controller is configured to control the operation of the controlled device by executing a first algorithm under which the controlled device is operated at a predetermined output level. The at least one energy-saving control algorithm is a second algorithm under which the controlled device is operated with energy consumption smaller than the energy consumption of the controlled device under the first algorithm.

An energy management system according to an aspect of the invention includes the energy management apparatuses each of which is the energy management apparatus describe above, and central server configured to be able to communicate with each of the energy management apparatuses.

In one embodiment, each of the energy management apparatuses is configured to send the central server the reduction information stored in the data storage unit corresponding to each of the energy-saving control algorithms. The central server is configured to statistically process the reduction information received from the energy management apparatuses for each corresponding energy-saving control algorithm. Each of the energy management apparatuses is configured to update the corresponding reduction information stored in the data storage unit on the basis of the reduction information after the statistical processing acquired from the central server.

In one embodiment, the central server is configured to statistically process reduction information received from the energy management apparatuses on the basis of attribute assigned to each of the energy management apparatuses. Each of the energy management apparatuses is configured to acquire the reduction information after the statistical processing corresponding to the attribute assigned thereto from the central server.

Another aspect of the invention provides an energy management method that includes: storing at least one energy-saving control algorithm, which controls an operation of a controlled device in a way to reduce energy consumption thereof; controlling the operation of the controlled device by executing the energy-saving control algorithm; storing reduction information corresponding to the energy-saving control algorithm, and used to figure out a reduction in the energy consumption of the controlled device due to the execution of the energy-saving control algorithm; estimating, when the operation of the controlled device is controlled by executing the energy-saving control algorithm, the reduction in the energy consumption of the controlled device due to the execution of the energy-saving control algorithm on the basis of the reduction information corresponding to the energy-saving control algorithm; and outputting an estimation result in accordance with the estimating.

As described above, the invention exhibits an effect of enabling an energy-saving effect by an energy-saving control to be figured out even when only one of the energy-saving control and a control consuming a larger amount of energy than the energy-saving control is performed.

BRIEF DESCRIPTION OF DRAWINGS

Preferred embodiments of the invention are described further in detail. Other characteristics and advantages of the invention can be more easily understood in relation to the detailed description and the attached drawings.

FIG. 6 is a view illustrating execution statuses of energy-saving control algorithms in the same embodiment.

FIG. 7 is a flowchart illustrating estimation and display processing of an energy-saving effect according to Embodiment 3.

FIG. 8 is a table view illustrating reduction information in the same embodiment.

FIG. 9 is a view illustrating execution statuses of scene control algorithms in the same embodiment.

FIG. 10 is a view illustrating execution statuses of energy-saving control algorithms according to Embodiment 4.

FIG. 17 is a table view illustrating another kind of reduction information in the same embodiment.

FIG. 18 is a table view illustrating still another kind of reduction information in the same embodiment.

DETAILED DESCRIPTION

Hereinafter, embodiments of the invention are explained on the basis of the drawings. The invention relates to an energy management apparatus for managing an energy consumption of at least one controlled device, and an energy management system provided with the energy management apparatus.

Embodiment 1

Figure 1:
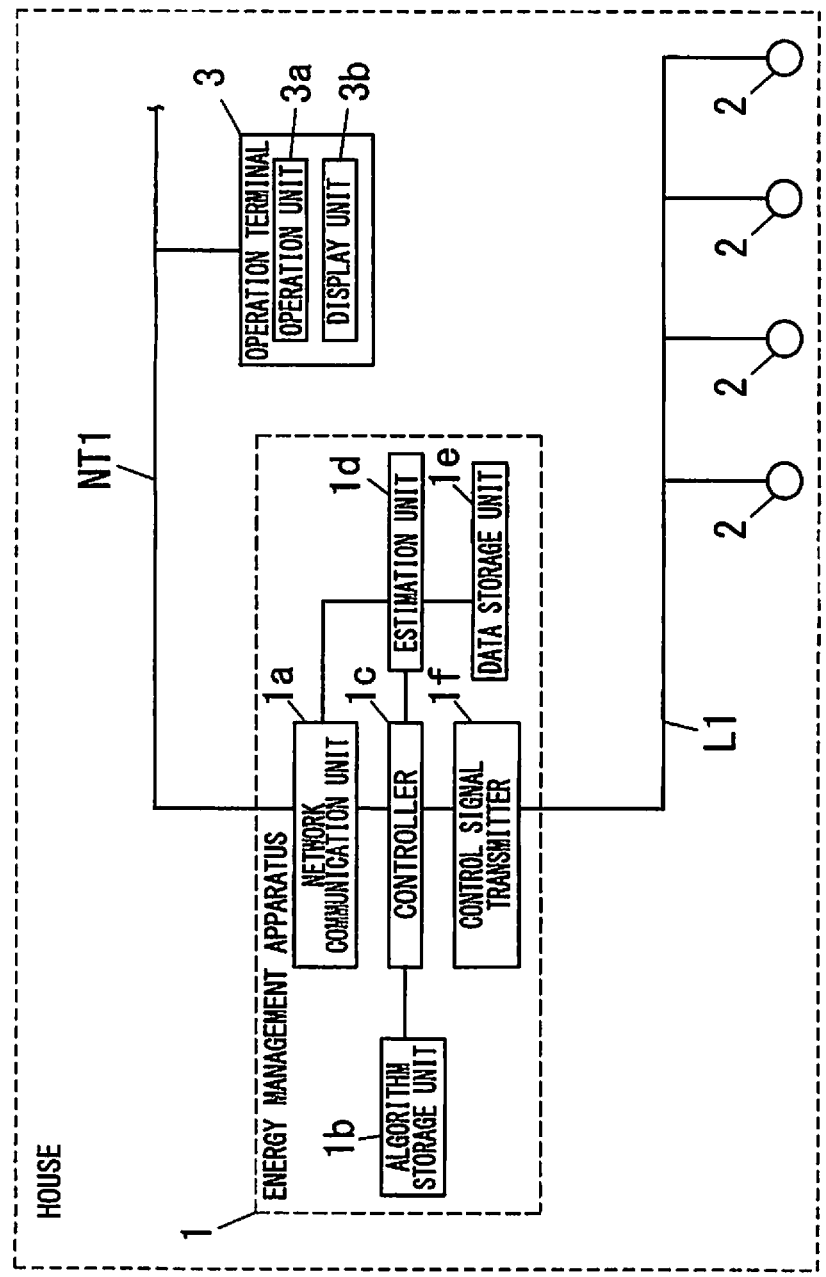
FIG. 1 is a block diagram illustrating an energy management system according to Embodiment 1.

FIG. 1 illustrates a configuration of an energy management system which uses energy management apparatus 1 according to Embodiment 1. In the embodiment, energy management apparatus 1 is configured to manage the energy consumption of at least one controlled device in accordance with an operation signal including at least one control code among multiple control codes determined in advance from an external device. In an example of FIG. 1, energy management apparatus 1 and multiple controlled devices 2 are connected to each other via control line L1. Energy management apparatus 1 is configured to control individual operations of multiple controlled devices 2. Note that controlled device 2 is an electric device, and a consumed-power amount of controlled device 2 is equivalent to an energy consumption. The energy management apparatus of the invention is not limited to the example of FIG. 1, but may be configured to control an operation of one controlled device.

As illustrated in FIG. 1, energy management apparatus 1 is connected to in-home network NT1, and in-home network NT1 is connected with, for example, operation terminal 3 (external device) including a personal computer. Operation terminal 3 includes operation unit 3a such as a key board and a mouse, and display unit 3b such as a liquid crystal screen, and is operated by a user. In the embodiment, operation terminal 3 is configured to transmit an operation signal including at least one control code among multiple control codes determined in advance to energy management apparatus 1 via in-home network NT1 in accordance with an operation input of operation unit 3a. When operation terminal 3 is configured of a personal computer, for example, operation terminal 3 has a program installed therein, the program created such that an operation signal including at least one control code among multiple control codes determined in advance is transmitted to energy management apparatus 1 via in-home network NT1 in accordance with an operation input of operation terminal 3.

Controlled device 2 is a lighting device, an air conditioner, or the like, and operates with the electric power supplied via a power line, which is not illustrated, and the operation thereof is controlled in accordance with a control signal transmitted from energy management apparatus 1 via control line L1.

Further, energy management apparatus 1 includes network communication unit 1a, algorithm storage unit 1b, controller 1c, estimation unit 1d, data storage unit 1e, and control signal transmitter 1f. Network communication unit 1a has an interface function of transmitting and receiving information to and from in-home network NT1, and is equivalent to an output unit in the invention. Moreover, network communication unit 1a functions as an input unit for receiving an operation signal from operation terminal 3.

Algorithm storage unit 1b stores multiple control algorithms in the form of a program for controlling the operation of controlled device 2, and there are two types of control algorithms, that is, a normal control algorithm and an energy-saving control algorithm. In other words, algorithm storage unit 1b is configured to store a normal control algorithm under which controlled device 2 is operated at a predetermined output level, and at least one energy-saving control algorithm under which the operation of controlled device 2 is controlled in a way to reduce the energy consumption thereof. In the embodiment, algorithm storage unit 1b stores multiple energy-saving control algorithms. Here, the normal control algorithm is a first algorithm under which controlled device 2 is operated at a predetermined output level (for example, rated output). The energy-saving control algorithm is a second algorithm under which controlled device 2 is operated with the energy consumption smaller than the energy consumption under the first algorithm.

Specifically, the first algorithm is a control pattern for controlling controlled device 2 in a way to improve the comfortableness for a user. Examples of the first algorithm include a control of a lighting device for turning on all the lights, a strong cooling operation control of an air conditioner for setting a low target temperature during a cooling operation, a heating operation control of an air conditioner for setting a high target temperature during a heating operation, a continuous operation control of an air conditioner for a continuous operation, or the like. This first algorithm is a control pattern which consumes a larger amount of power than that of the second algorithm, and is a first control (mode).

The second algorithm is a control pattern for controlling the operation of controlled device 2 in a way to reduce the consumed-power amount thereof. Examples of the second algorithm include a light control of a lighting device for setting a low light control level, a weak cooling operation control of an air conditioner for setting a high target temperature during a cooling operation, a weak heating operation control of an air conditioner for setting a low target temperature during a heating operation, and an intermittent operation control of an air conditioner for an intermittent operation, or the like. This second algorithm is a control pattern which consumes a smaller amount of power than that of the first algorithm, and is a second control (mode).

Controller 1c is configured to execute the first algorithm under which controlled device 2 is operated at a predetermined output level to control the operation of controlled device 2, and to execute the second algorithm to control the operation of controlled device 2. In the embodiment, controller 1c is configured to receive algorithm selection information (at least one control code), which is described later, from operation terminal 3 via network communication unit 1a, select the first or second algorithm to be executed on the basis of the algorithm selection information, and read out the selected algorithm from algorithm storage unit 1b. Further, controller 1c is configured to create a control signal for controlling controlled device 2 as a control target by executing the selected first or second algorithm. More specifically, as illustrated in FIG. 1, since multiple controlled devices 2 are connected to control line L1, controller 1c executes the selected first or second algorithm on controlled device 2 as a control target, that is, controlled device 2 designated by operation terminal 3, and thereby controls the operation of controlled device 2 thus designated. In the embodiment, controller 1c creates a control signal for controlling controlled device 2 thus designated.

Further, control signal transmitter 1f sends out the control signal created by controller 1c to control line L1, and transmits the control signal to controlled device 2 as a control target. Controlled device 2 having received the control signal addressed thereto operates in accordance with the content of the control signal.

In the energy management system of such a configuration, energy management apparatus 1 is configured to estimate an energy-saving effect by the executed second algorithm when executing the second algorithm, and display the energy-saving effect on display unit 3b of operation terminal 3. Hereinafter, estimation and display processing of the energy-saving effect is explained using a flowchart of FIG. 2.

Firstly, when a user operates operation unit 3a of operation terminal 3 to select a desired second algorithm among multiple second algorithms for all or part of multiple controlled devices 2 (for example, one controlled device 2), operation terminal 3 transmits the selection result as algorithm selection information to energy management apparatus 1. Controller 1c of energy management apparatus 1 executes the second algorithm selected from algorithm storage unit 1b on the basis of the received algorithm selection information, and thereby controls the operation of controlled device 2. Further, estimation unit 1d of energy management apparatus 1 determines the second algorithm being executed by controller 1c as a second algorithm of an effect estimation target (S1).

Next, estimation unit 1d is configured to estimate, when controller 1c executes the second algorithm to control the operation of controlled device 2, a reduction in the energy consumption of controlled device 2 due to the execution of the second algorithm on the basis of reduction information corresponding to the second algorithm. In the embodiment, estimation unit 1d refers to data storage unit 1e to figure out a reduction (energy-saving effect) in the consumed-power amount of controlled device 2 due to the execution of the second algorithm. Data storage unit 1e is configured to store reduction information corresponding to a second algorithm and used to figure out the reduction in the energy consumption of controlled device 2 due to the execution of the second algorithm. In the embodiment, data storage unit 1e is configured to store respective pieces of reduction information corresponding to multiple second algorithms, and each piece of reduction information is herein used to figure out the reduction in the energy consumption of controlled device 2 due to the execution of the corresponding second algorithm. In an example illustrated in FIG. 3, data storage unit 1e stores in advance the reduction information corresponding to each of the second algorithms in table TB1. To be specific, in table TB1, reduction information K1 used to figure out the reduction in the consumed-power amount due to the execution of each second algorithm is stored corresponding to the second algorithm. Reduction information K1 indicates a ratio of a consumed-power amount reduced due to the execution of a second algorithm in a case where the second algorithm is executed on one or more certain controlled devices 2, with respect to the sum of power usages (total consumed-power amount) of all controlled devices 2 including controlled device 2 operated under the energy-saving control (second control). For example, if the total consumed-power amount is 100 (kWh) and reduction information K1 of a running second algorithm is 10(%), the reduction in the consumed-power amount due to the execution of the second algorithm is estimated to 10 (kWh).

Figures 2, 3:
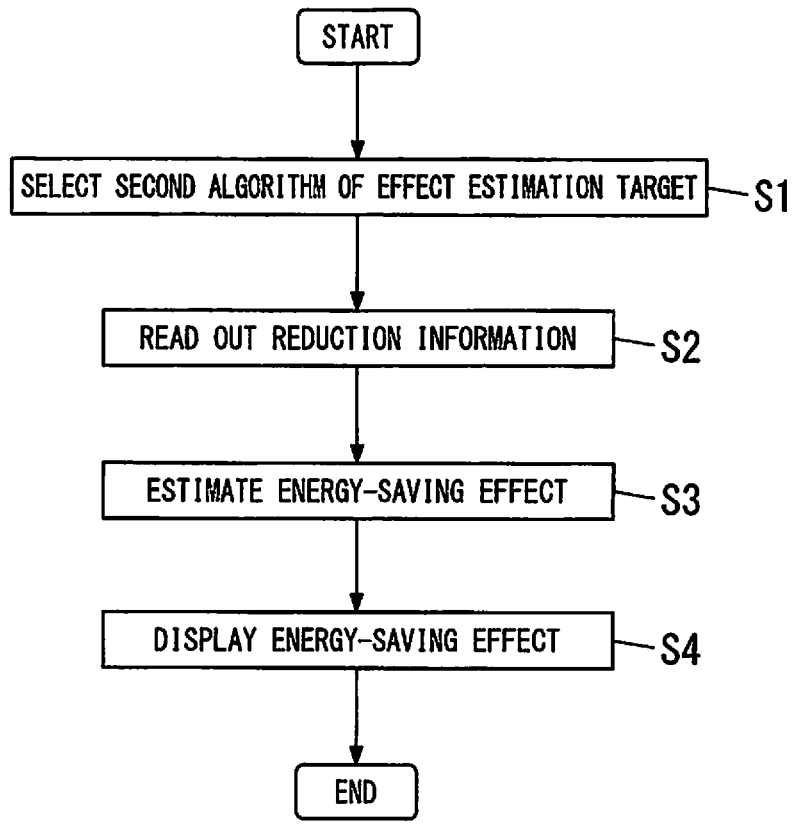
FIG. 2 is a flowchart illustrating estimation and display processing of an energy-saving effect in the same embodiment.
FIG. 3 is a table view illustrating reduction information in the same embodiment.

Estimation unit 1d reads out reduction information K1 of a second algorithm being executed from data storage unit 1e (S2). Estimation unit 1d figures out an energy-saving effect by the running second algorithm by using reduction information K1 thus read (S3). In the embodiment, reduction information K1 is set to indicate an energy-saving effect, and estimation unit 1d figures out an energy-saving effect of "1%" when second algorithm M1 in FIG. 3 is executed alone, for example. When each second algorithm M2, M3 or M4 is executed alone, estimation unit 1d figures out an energy-saving effect of "2%", "5%" or "3%".

In short, when the algorithm of certain controlled device 2 is changed from a first algorithm to a second algorithm, the energy consumption of certain controlled device 2 is reduced from the energy consumption under the first algorithm to the energy consumption under the second algorithm. In other words, although the energy consumption under the first algorithm is used as the reference of the reduction in the energy consumption under the second algorithm, the reduction information in the embodiment uses the total energy consumption (total consumed-power amount) of all of controlled devices 2 by the first algorithm as the reference. Accordingly, reduction information "1%" by second algorithm M1 in FIG. 3 indicates the ratio of the consumed-power amount reduced due to the execution of the second algorithm relative to the total energy consumption of all of controlled devices 2 by the first algorithm. The use of such reduction information allows the overall energy-saving effect to be calculated with a simple arithmetical operation.

For example, when multiple second algorithms are simultaneously being executed, the sum of the pieces of reduction information of the multiple second algorithms being executed is the energy-saving effect. In other words, when second algorithms M1 and M3 in FIG. 3 are simultaneously executed, the energy-saving effect is "6(%)" (=1(%)+5(%)).

In the embodiment, the energy-saving effect is calculated for every second algorithm on the basis of the energy consumption under the first algorithm (the total energy consumption of all of controlled devices 2 by the first algorithm in the embodiment), and when multiple second algorithms are simultaneously being executed, the sum of the energy-saving effects by the individual second algorithms is figured out.

Accordingly, even when only the second control is performed, an energy-saving effect by the executed second control can be determined on the basis of reduction information K1 stored in advance.

Network communication unit 1a transmits an estimation result of the energy-saving effect by estimation unit 1d to operation terminal 3, and display unit 3b of operation terminal 3 displays the energy-saving effect by the second algorithm being executed (S4). Since a user can recognize the energy-saving effect by the executed second control by viewing the display content on display unit 3b, the user is made aware of the second control, and thereby can be motivated to take the energy-saving action.

In one embodiment, when controller 1c executes the first algorithm, estimation unit 1d figures out an energy-saving effect, which is estimated if the executed first algorithm is replaced with a second algorithm, and causes display unit 3b to display the effect thereon. With this embodiment, even when only the first control is performed, the energy-saving effect by the second control can be figured out on the basis of reduction information K1 stored in advance.

Embodiment 2

Figure 4:
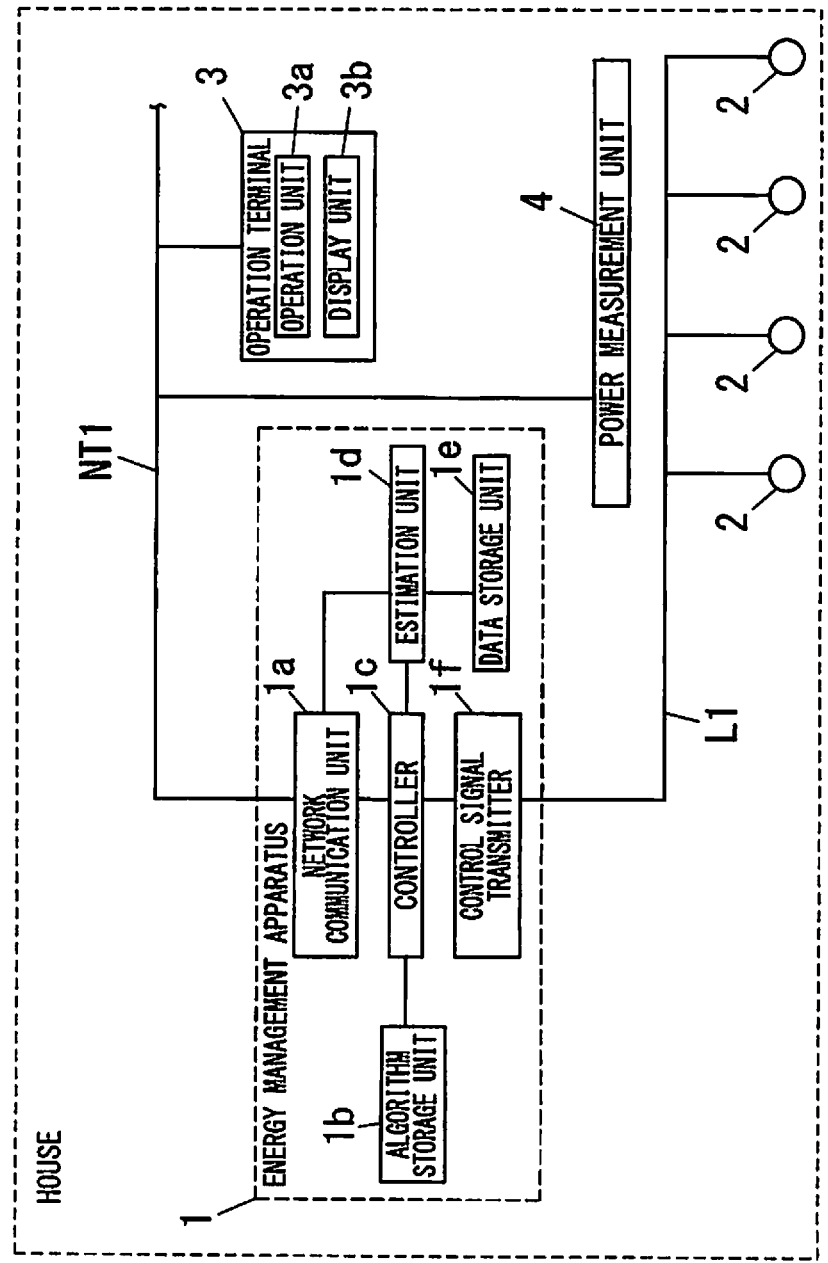
FIG. 4 is a block diagram illustrating an energy management system according to Embodiment 2.

FIG. 4 illustrates a configuration of an energy management system which uses energy management apparatus 1 according to Embodiment 2. The energy management system further includes power measurement unit 4 configured to measure the consumed-power amount of controlled device 2. Note that, the same reference numeral is applied to the configuration similar to that of Embodiment 1, and an explanation thereof is omitted.

Power measurement unit 4 is connected to in-home network NT1, and is configured to measure the sum of the consumed-power amounts of all of controlled devices 2 (total consumed-power amount), and transmit total consumed-power amount data to energy management apparatus 1.

Note that, the total consumed-power amount is obtained by any method including a method of measuring the consumed-power amount supplied from a main electric path led into a house, a method of measuring the consumed-power amount of each controlled device 2, and calculating the sum of the measured consumed-power amounts, or the like.

Figure 5:
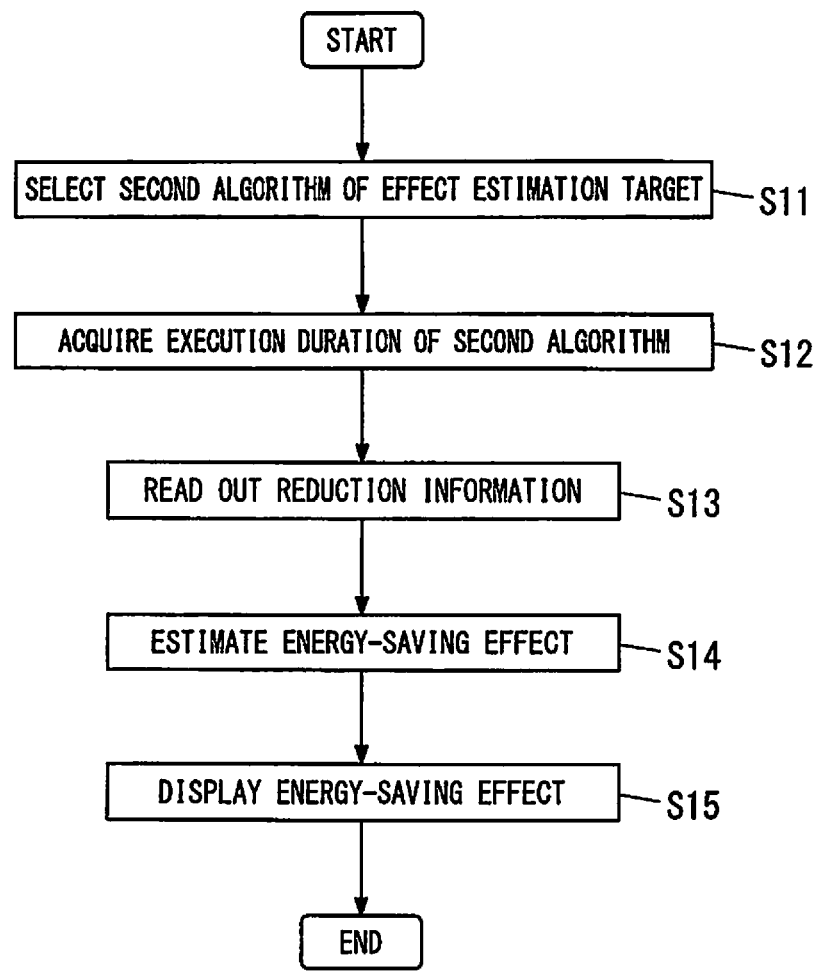
FIG. 5 is a flowchart illustrating estimation and display processing of an energy-saving effect in the same embodiment.

Further, estimation processing of an energy-saving effect by estimation unit 1d in the embodiment is performed on a periodic basis, and the estimation and display processing of an energy-saving effect in the embodiment is explained using a flowchart of FIG. 5.

Firstly, when a user operates operation unit 3a of operation terminal 3 to select a desired second algorithm among multiple second algorithms for all or part of multiple controlled devices 2 (for example, one controlled device 2), operation terminal 3 transmits the selection result as algorithm selection information to energy management apparatus 1. Controller 1c of energy management apparatus 1 executes the second algorithm selected from algorithm storage unit 1b on the basis of the received algorithm selection information, and thereby controls the operation of controlled device 2. Further, estimation unit 1d of energy management apparatus 1 determines the second algorithm executed by controller 1c as a second algorithm of an effect estimation target (S11).

Estimation unit 1d acquires an execution start time of the second algorithm by controller 1c and an execution finish time of the second algorithm by controller 1c, and acquires (measures) a period between the execution start time and the execution finish time as an execution duration (S12). For example, energy management apparatus 1 (for example, estimation unit 1d) includes a timer device such as a timer circuit, and estimation unit 1d acquires the execution start time or the execution finish time from the timer device.

Next, estimation unit 1d reads out reduction information K1 of the executed second algorithm (see FIG. 3) from data storage unit 1e (S13). Estimation unit 1d figures out the reduction (energy-saving effect) in the consumed-power amount due to the execution of the second algorithm on the basis of reduction information K1 in data storage unit 1e and a detection (measurement) result of the execution duration (S14).

FIG. 6 illustrates execution statuses of second algorithms for 24 hours (one day), for example. In this case, estimation processing of an energy-saving effect by estimation unit 1d is as follows. Note that, in an example of FIG. 6, estimation processing of an energy-saving effect by estimation unit 1d is performed for every 24 hours, and the energy-saving effect of the second algorithms executed during the 24 hours is estimated. In FIG. 6, a mark "■" indicates that a corresponding algorithm is executed in a corresponding time slot. For example, "■" at 7:00 indicates that second algorithm M1 is executed during one hour from 7:00 to 8:00. The example of FIG. 6 indicates that second algorithm M1 is executed during four hours from 7:00 to 11:00.

Specifically, in the embodiment, estimation unit 1d divides 24 hours into time slots by hour, and a second algorithm executed in each time slot, even in a short period of time, is determined to be executed in this time slot. For example, the execution duration of a second algorithm executed only for three minutes from 7:15 to 7:18 is determined as from 7:00 to 8:00.

In FIG. 6, the execution duration of second algorithm M1 is four hours from 7:00 to 11:00, and the execution duration of second algorithm M2 is one hour from 9:00 to 10:00. Moreover, the execution duration of second algorithm M3 is four hours from 16:00 to 20:00, and the execution duration of second algorithm M4 is eight hours from 8:00 to 16:00.

In addition, estimation unit 1d calculates the total consumed-power amount (kWh) for every time slot on the basis of total consumed-power amount data from power measurement unit 4.

In short, while the energy-saving effect is indicated using the ratio (%) in Embodiment 1, the energy-saving effect is indicated using wattage (for example, kWh) in Embodiment 2. For example, in FIG. 6, the energy-saving effect from 7:00 to 8:00 is 1% according to Embodiment 1. When the total consumed-power amount of all of controlled devices 2 by the first algorithm described in Embodiment 1 per hour is denoted by P [kWh], the energy-saving effect from 7:00 to 8:00 is P×0.01 [kWh]. However, not all of controlled devices 2 operate in the time slot from 7:00 to 8:00. Accordingly, if the actual total consumed-power amount (3.7 [kWh]) from 7:00 to 8:00 is further considered, the energy-saving effect from 7:00 to 8:00 is P×0.01×3.7/P=0.01×3.7.

Therefore, estimation unit 1d multiplies the total consumed-power amount in each time slot by reduction information K1 of a second algorithm executed in the time slot, and figures out the sum of the multiplication results as the energy-saving effect for one day (24 hours). When execution statuses of the second algorithms for 24 hours are those illustrated in FIG. 6, the energy-saving effect for one day is figured out in accordance with equation (1).

$$\text{Energy-saving effect} = (3.7+1.6+0.7+0.5) \times 0.01 + (0.7) \times 0.02 + (0.1+1.3+1.7+1.3) \times 0.05 + (1.6+0.7+0.5+0.4+0.3+1.0+0.5+0.1) \times 0.03 = 0.45 \text{ (kWh)} \quad \text{equation (1)}$$

In other words, in the embodiment, the energy-saving effect for each second algorithm is calculated, and when multiple second algorithms are simultaneously executed, the sum of the energy-saving effects by the individual second algorithms is figured out.

Accordingly, even when only the second control is performed, an energy-saving effect by the executed second control can be figured out on the basis of reduction information K1 stored in advance.

Network communication unit 1a transmits an estimation result of the energy-saving effect by estimation unit 1d to operation terminal 3, and display unit 3b of operation terminal 3 displays the energy-saving effect by the executed second algorithm (S15). Since a user can recognize the energy-saving effect by the executed second control by viewing the display content on display unit 3b, the user is made aware of the second control, and thereby can be motivated to take the energy-saving action.

Moreover, in the embodiment, because the energy-saving effect is expressed by the consumed-power amount (kWh), a user can specifically recognize the reduction in the consumed-power amount, and can easily recognize the energy-saving effect by the executed second control. In addition, because the energy-saving effect is estimated using the execution duration of the second algorithm, the estimation accuracy of the energy-saving effect is improved.

Embodiment 3

In Embodiment 3, an operation using a scene control as a second algorithm in an energy management system which uses energy management apparatus 1 of Embodiment 2 is explained. Note that, the same reference numeral is applied to the configuration similar to that of Embodiment 2, and an explanation thereof is omitted.

The scene control is not a control executing a single second control but instead is a control of a combination of multiple second controls including a light control, a weak cooling operation control, a weak heating operation control, an intermittent operation control, or the like. For example, a summer night sleep scene control is a second control for a bedtime environment by a combination of the light control and the weak cooling operation control. Moreover, a winter morning wake-up scene control is a second control for a wake-up environment by a combination of the light control and the weak heating operation control. The specific control contents by the scene control are not limited to the above, and the scene control may be configured by combining any two or more second controls.

Further, estimation processing of an energy-saving effect by estimation unit 1d in the embodiment is performed on a periodic basis, and estimation and display processing of an energy-saving effect in the embodiment is explained using a flowchart of FIG. 7.

Firstly, a user operates operation unit 3a of operation terminal 3 to select a desired scene control algorithm among multiple scene control algorithms for all or part of multiple controlled devices 2 (for example, multiple controlled devices 2), and operation terminal 3 transmits the selection result as algorithm selection information to energy management apparatus 1. Controller 1c of energy management apparatus 1 executes the scene control algorithm selected from algorithm storage unit 1b on the basis of the received algorithm selection information, and thereby controls the operation of controlled device 2. Further, estimation unit 1d of energy management apparatus 1 determines the scene control algorithm executed by controller 1c as a scene control algorithm of an effect estimation target (S21).

Estimation unit 1d creates operation history information on the scene control algorithm (start operation time, end operation time) on the basis of the algorithm selection information from operation unit 3a of operation terminal 3, and acquires (measures) a period between the execution start time and the execution finish time as an execution duration (S22).

Next, estimation unit 1d reads out reduction information K2 of the executed scene control algorithm from data storage unit 1e (S23). Data storage unit 1e stores in advance reduction information corresponding to each scene control algorithm in table TB2 as illustrated in FIG. 8, and each of scene control algorithms M11 and M12 is equivalent to a second algorithm. To be specific, in table TB2, reduction information K2 used to figure out the reduction in the consumed-power amounts of multiple controlled devices 2 due to the execution of the scene control algorithms is stored corresponding to each of the scene control algorithms. Reduction information K2 indicates a ratio of the consumed-power amount reduced due to the execution of the scene control algorithm in a case where a scene control algorithm is executed, with respect to the sum of the consumed-power amounts (total consumed-power amount) of all of controlled devices 2 including controlled device 2 being operated under the scene control. For example, if the total consumed-power amount is 100 (kWh) and the reduction information K2 of a scene control algorithm being executed is 10(%), the reduction in the consumed-power amount due to the execution of the scene control algorithm is estimated to 10 (kWh).

Further, estimation unit 1d figures out the reduction (energy-saving effect) in the consumed-power amount due to the execution of the scene control algorithm on the basis of reduction information K2 in data storage unit 1e and a detection (measurement) result of the execution duration (S24).

When the execution statuses of scene control algorithms for 24 hours (one day) are those illustrated in FIG. 9, for example, estimation processing of an energy-saving effect by estimation unit 1d is as follows. Note that, in this case, estimation processing of an energy-saving effect by estimation unit 1d is performed for every 24 hours, and the energy-saving effect of the second algorithms executed during the 24 hours is estimated.

Specifically, in the embodiment, estimation unit 1d divides 24 hours into time slots by hour, and a scene control algorithm executed in each time slot, even in a short period of time, is determined to be executed in this time slot. For example, the execution duration of a scene control algorithm executed only for three minutes from 7:15 to 7:18 is determined as from 7:00 to 8:00.

In FIG. 9, the execution duration of scene control algorithm M11 is eight hours from 1:00 to 8:00 and from 24:00 to 1:00, and the execution duration of scene control algorithm M12 is three hours from 12:00 to 15:00.

In addition, estimation unit 1d calculates the total consumed-power amount (kWh) for every time slot on the basis of total consumed-power amount data from power measurement unit 4.

Further, estimation unit 1d multiplies the total consumed-power amount in each time slot by reduction information K2 of a scene control algorithm executed in the time slot, and figures out the energy-saving effect for one day (24 hours) the sum of the multiplication results. When the execution statuses of the scene control algorithms for 24 hours are those illustrated in FIG. 9, the energy-saving effect for one day is figured out in accordance with equation (2).

$$\text{Energy-saving effect} = (0.7+0.5+0.5+0.5+0.5+0.6+3.7+0.5) \times 0.1 + (0.3+1.0+0.5) \times 0.08 = 0.89 \text{ (kWh)} \quad \text{equation (2)}$$

In other words, in the embodiment, the energy-saving effect for each scene control algorithm is calculated, and when multiple scene control algorithms are simultaneously executed, the sum of the energy-saving effects by the individual scene control algorithms is figured out.

Accordingly, even when only the second control is performed, an energy-saving effect by the executed scene control can be figured out on the basis of reduction information K2 stored in advance.

Network communication unit 1a transmits an estimation result of the energy-saving effect by estimation unit 1d to operation terminal 3, and display unit 3b of operation terminal 3 displays the energy-saving effect by the executed second algorithm (S25). Since a user can recognize the energy-saving effect by the executed second control by viewing the display content on display unit 3b, the user is made aware of the second control, and thereby can be motivated to take the energy-saving action.

Moreover, in the embodiment, since the energy-saving effect is expressed by the consumed-power amount (kWh), a user can specifically know the reduction in the consumed-power amount, and can easily recognize the energy-saving effect by the executed second control. In addition, since the energy-saving effect is estimated using the execution duration of the scene control algorithm, the estimation accuracy of the energy-saving effect is improved.

Embodiment 4

In Embodiments 2 and 3, estimation unit 1d divides 24 hours into time slots by hour, and a second algorithm executed in each time slot, even in a short period of time, is determined to be executed in this time slot. For example, the execution duration of a second algorithm executed even only for three minutes from 7:15 to 7:18 is determined as from 7:00 to 8:00.

In contrast, estimation unit 1d according to Embodiment 4 includes a timer device such as a timer circuit or the like, and measures the time length of the execution duration. Further, estimation unit 1d estimates the consumed-power amount in an execution duration when the time length of this execution duration of the second algorithm (including the scene control algorithm) is not less than the minimum duration length (lower limit value). Meanwhile, when the time length of an execution duration of the second algorithm is less than the minimum duration length, estimation unit 1d does not estimate the reduction in the consumed-power amount in this execution duration.

For example, FIG. 10 illustrates execution statuses of scene control algorithms M11 and M12, and the minimum duration length is set to five minutes. Here in FIG. 10, "S" indicates a start operation time, and "E" indicates an end operation time.

Scene control algorithm M11 is executed from the start operation time of 9:42 to the end operation time of 9:46, and the time length of the execution duration is four minutes. Further, because the time length "four minutes" of the execution duration of scene control algorithm M11 is less than the minimum duration length "five minutes", it is determined that scene control algorithm M11 in this period is not executed. Accordingly, estimation unit 1d neither treats a time slot from 9:00 to 10:00 as an execution duration, nor performs estimation processing of an energy-saving effect due to the execution of scene control algorithm M11 for the time slot from 9:00 to 10:00.

This situation occurs in a case, for example, where after a start operation of scene control algorithm M11 is erroneously performed, an end operation is performed in order to cancel the start operation. Since the execution duration is too short, no energy-saving effect might be produced. Therefore, in the embodiment, the estimation accuracy of the energy-saving effect is improved because no estimation processing is performed for an energy-saving effect due to the execution of the second algorithm in a short period of time caused by such an erroneous operation or the like.

Next, processing in a case where the execution duration of a second algorithm (including a scene control algorithm) ranges across the hour is explained.

In FIG. 10, it is assumed that scene control algorithm M12 is executed from the start operation time of 9:58 to the end operation time of 10:01. In this case, since the time length "three minutes" of the execution duration of scene control algorithm M12 is less than a first minimum duration length "five minutes", estimation unit 1d does not perform estimation processing of an energy-saving effect in this period.

In FIG. 10, it is assumed that scene control algorithm M12 is executed from the start operation time of 9:56 to the end operation time of 10:07. In this case, since the time length "eleven minutes" of the execution duration of scene control algorithm M12 is not less than the first minimum duration length "five minutes", estimation unit 1d treats, as an execution duration, only one of a time slot from 9:00 to 10:00 and a time slot from 10:00 to 11:00 that has a longer execution time of the algorithm. In this case, only the time slot from 10:00 to 11:00 is treated as the execution duration, and estimation processing of an energy-saving effect is performed only for the time slot from 10:00 to 11:00.

In addition, another minimum duration length "one hour and fifteen minutes" (second minimum duration length) may be set in addition to the minimum duration length "five minutes" (first minimum duration length), and the following processing may be performed. For example, it is assumed that scene control algorithm M12 is executed from the start operation time of 9:30 to the end operation time of 10:50. In this case, the time length "one hour and twenty minutes" of the execution duration of scene control algorithm M12 is not less than the second minimum duration length "one hour and fifteen minutes". Accordingly, estimation unit 1d treats both time slots from 9:00 to 10:00 and from 10:00 to 11:00 as execution durations, and performs estimation processing of an energy-saving effect for both the time slots. Meanwhile, if the time length of the execution duration of scene control algorithm M12 is less than the second minimum duration length "one hour and fifteen minutes", estimation unit 1d compares the time length of the execution duration with the first minimum duration length "five minutes", and performs the same processing as the above.

In this manner, even in a case where the execution duration of a second algorithm ranges across the hour, a target period for estimation processing of an energy-saving effect can be appropriately set in accordance with the time length of the execution duration. Thus, the estimation accuracy of the energy-saving effect is improved.

Note that, other configurations are similar to those in Embodiment 2 or 3, and an explanation thereof is omitted.

Embodiment 5

Figure 11:
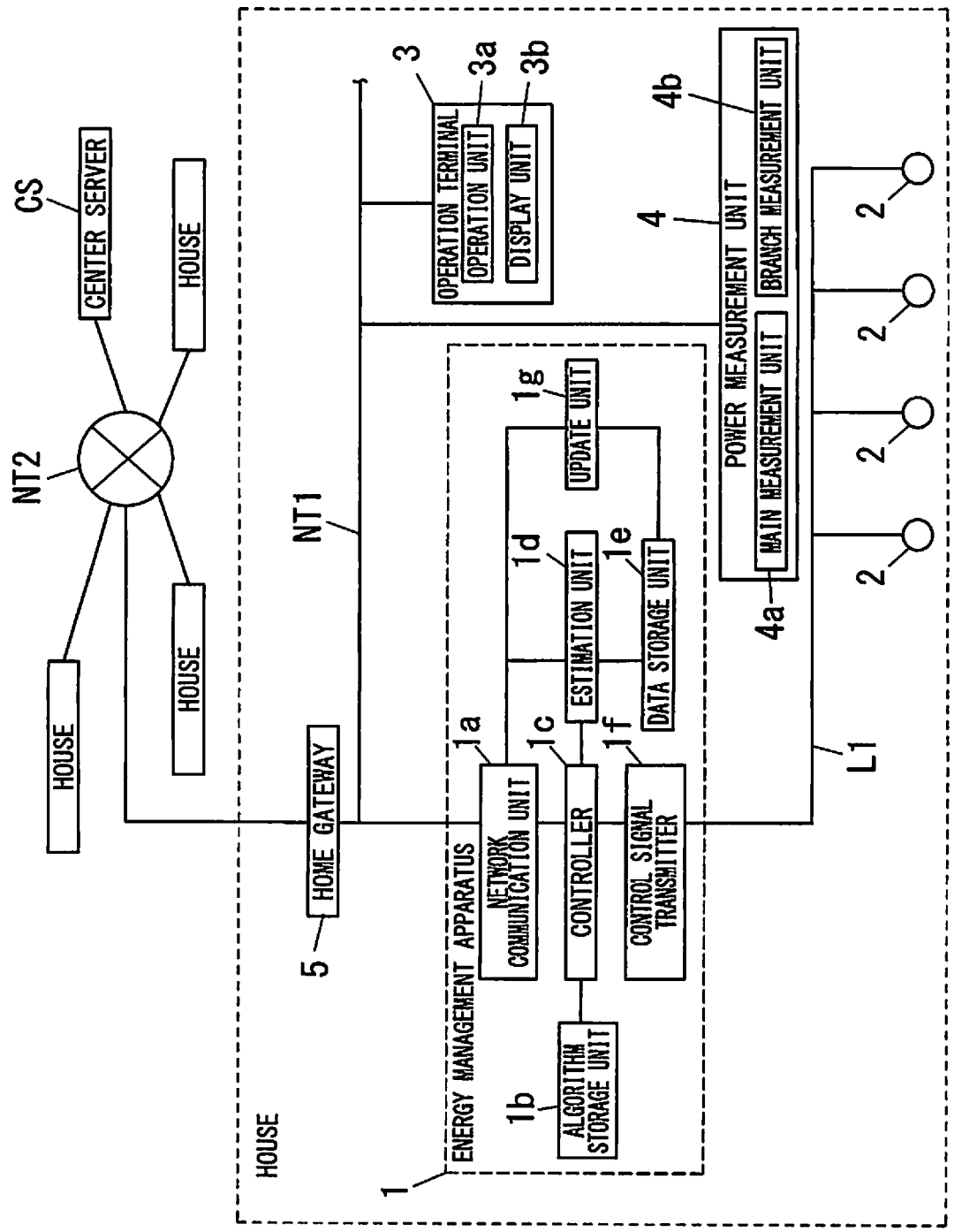
FIG. 11 is a block diagram illustrating an energy management system according to Embodiment 5.

FIG. 11 illustrates a configuration of an energy management system which uses energy management apparatus 1 according to Embodiment 5. The energy management system is installed in each of multiple houses. The system is further provided with power measurement unit 4 configured to measure the consumed-power amount of each controlled device 2 in each house, and energy management apparatus 1 in each house includes update unit 1g.

Further, home gateway 5 is connected to in-home network NT1 in each house. Home gateway 5 has network interface functions including a router function, a protocol conversion function, and a firewall function, between in-home network NT1 and Internet NT2, and in-home network NT1 is connected to Internet NT2. Accordingly, each terminal on in-home network NT1 can be connected to Internet NT2 via home gateway 5. Central server CS is connected to Internet NT2, and energy management apparatus 1 is configured to be communicable with central server CS by a network. In other words, each energy management apparatus 1 provided in each of the multiple houses can transmit and receive data with central server CS.

Note that, other configurations are similar to those of any of Embodiments 1 to 4, the same reference numeral is applied to the similar configuration and an explanation thereof is omitted.

Power measurement unit 4 in the embodiment includes main measurement unit 4a configured to measure the amount of consumed-power supplied from a main electric path led into the house as a total consumed-power amount, and branch measurement unit 4b configured to measure each consumed-power amount of each controlled device 2 as an individual consumed-power amount. Further, power measurement unit 4 transmits data of the total consumed-power amount and data of the individual consumed-power amount to energy management apparatus 1.

Update unit 1g is configured to update reduction information K (reduction information K1 to K4) stored in data storage unit 1e corresponding to an executed second algorithm, on the basis of the respective consumed-power amounts measured by power measurement unit 4 before and after controller 1b starts executing the second algorithm.

Figure 12:
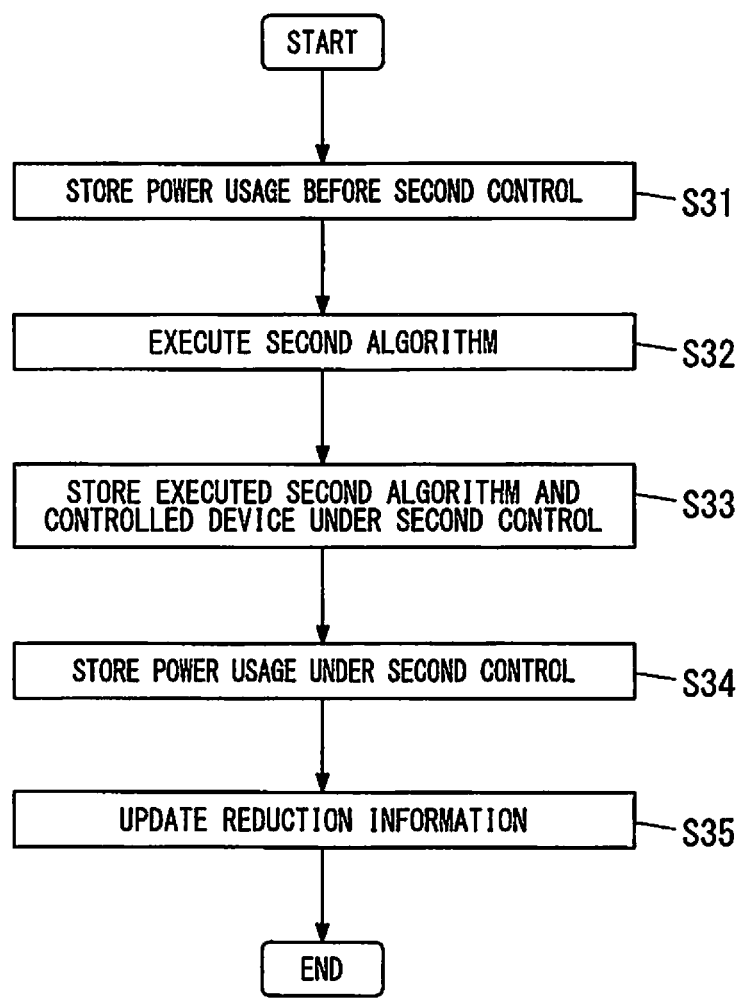
FIG. 12 is a flowchart illustrating update processing of reduction information in the same embodiment.

Hereinafter, update processing of reduction information by update unit 1g is explained using a flowchart of FIG. 12.

Firstly, update unit 1g cyclically acquires total consumed-power amount data and individual consumed-power amount data from power measurement unit 4. In other words, update unit 1g acquires total consumed-power amount data and individual consumed-power amount data even before the execution of a second algorithm, and stores total consumed-power amount data and individual consumed-power amount data before the execution of the second algorithm (S31).

Next, controller 1c executes a certain second algorithm (S32). Further, update unit 1g stores information (for example, identification information) on the executed second algorithm, and further stores information (for example, identification information) on controlled device 2 controlled by the execution of the second algorithm (S33).

Further, update unit 1g extracts individual consumed-power amount data under the second control of controlled device 2 of the control target from the power amount data acquired from power measurement unit 4, and stores the individual consumed-power amount data (S34). Here, when multiple controlled devices 2 are present as control targets, update unit 1g extracts individual consumed-power amount data of multiple controlled devices 2 of the control targets, and calculates and stores the sum of all the individual consumed-power amounts. Moreover, when a scene control algorithm including a combination of two or more second controls is executed, update unit 1g extracts individual consumed-power amount data of each of multiple controlled devices 2 of the control targets, and calculates and stores the sum of all the individual consumed-power amounts. In another case, the individual consumed-power amounts are not measured in some controlled devices 2. In this case, the total consumed-power amount is used as a consumed-power amount for such controlled device 2.

Further, from the power amount data before the second control which is stored at step S31, update unit 1g extracts power amount data under the second control of controlled device 2 of the control target for the second algorithm executed at step S32. Further, update unit 1g compares the power amount data under the second control of controlled device 2 of the control target, which is stored at step S34, with the power amount data before the second control. Update unit 1g newly calculates reduction information K of the second algorithm executed at step S32 on the basis of the comparison result, and updates the reduction information K stored in data storage unit 1e to the reduction information K newly calculated (S35).

Accordingly, because update unit 1g updates reduction information K of the second algorithm on the basis of the power usages measured before and after the start of the execution of the second algorithm, the accuracy of the reduction information K is improved and the estimation accuracy of the energy-saving effect is also improved.

Figure 13:
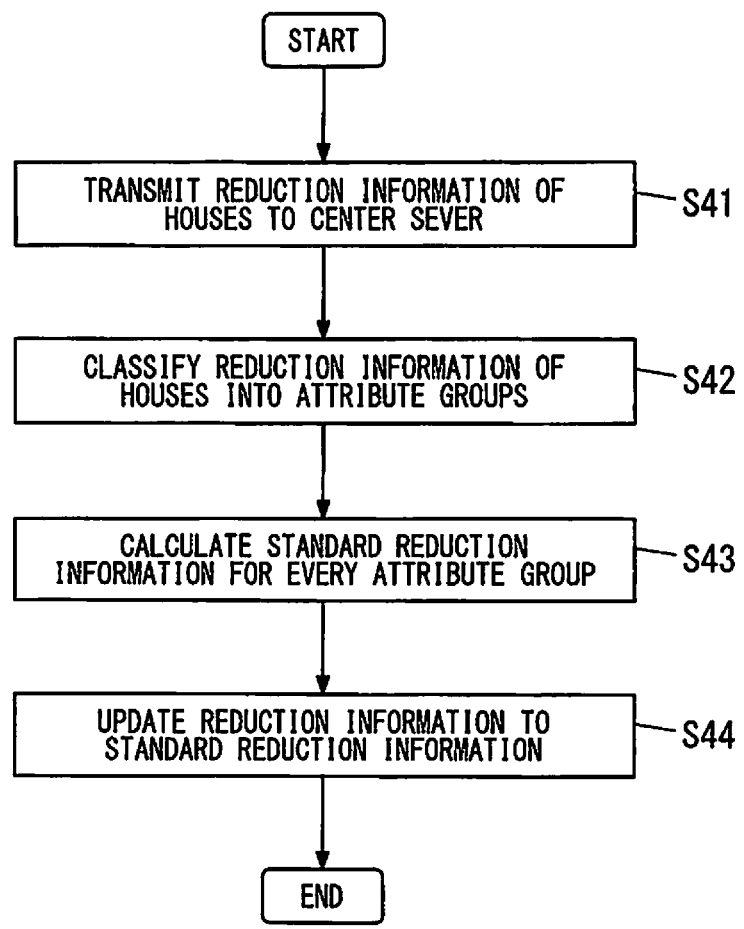
FIG. 13 is a flowchart illustrating update processing of standard reduction information in the same embodiment.

Moreover, respective energy management apparatuses 1 provided in the multiple houses transmit and receive data with central server CS, and communication processing between energy management apparatuses 1 and central server CS is explained using a flowchart of FIG. 13.

Firstly, controller 1c of energy management apparatus 1 in each of the houses sends central server CS data of reduction information K (reduction information K1 to K4) stored in data storage unit 1e corresponding to the respective second algorithms (S41).

The reduction information K is updated at any time in each house on the basis of the power usages measured before and after the start of the execution of the second algorithm. However, because attributes such as the weather, the building, the equipment, or the household differs among the houses, the power use status also differs among the houses, and the reduction information K also differs among the houses. Therefore, attribute information on each house is added to data of reduction information K transmitted from energy management apparatus 1 to central server CS.

The attributes include a weather attribute, a building attribute, an equipment attribute, a household attribute, or the like. The parameter of the weather attribute includes the average temperature, the average humidity, or the like. The parameter of the building attribute includes the building structure (wooden, reinforced concrete, etc.), the age of the building, or the like. The parameter of the equipment attribute includes the cooling and heating equipment (electricity, gas, kerosene, central hot water supply, etc.), the cooking equipment (electricity, gas, etc.), the number of devices (lighting device, air conditioner, household appliance, etc.), or the like. The parameter of the household attribute includes the number of family members, their ages, or the like.

Central server CS performs the sensitivity analysis (for example, the energy consumption (J/m2)) of the parameters, which may cause the power consumption, for every second algorithm on the basis of the attribute information received from energy management apparatus 1 in each house. Further, central server CS classifies the pieces of reduction information K of the respective second algorithms with similar attributes into the same group (attribute group) on the basis of the sensitivity analysis results, and thereby classifies each piece of reduction information K into any of attribute groups (S42). Further, central server CS statistically processes the pieces of reduction information K in every attribute group, and calculates and stores standard reduction information Ka generalized for every attribute group (S43).

In this manner, the pieces of reduction information K set on the basis of the actual consumed-power amount are statistically processed for every attribute group of the houses, thereby making it possible to calculate standard reduction information Ka generalized for the attribute group. Further, energy management apparatus 1 in each house acquires standard reduction information Ka from central server CS, and updates reduction information K stored in data storage unit 1e to standard reduction information Ka to obtain new reduction information K (S44).

Accordingly, energy management apparatus 1 in each house can use standard reduction information Ka in which reduction information K in other houses belonging to the same attribute group is considered, and thereby can estimate a general energy-saving effect in the houses belonging to the same attribute group.

Further, data storage unit 1e of energy management apparatus 1 used in an energy management system before installation may store, as a default value, standard reduction information Ka in an attribute group including the attributes of a house where the energy management system is to be installed and the energy management system may be shipped. In this manner, the use of standard reduction information Ka as a default value of reduction information K allows even a never-operated energy management system to secure the estimation accuracy of an energy-saving effect.

Embodiment 6

Figure 14:
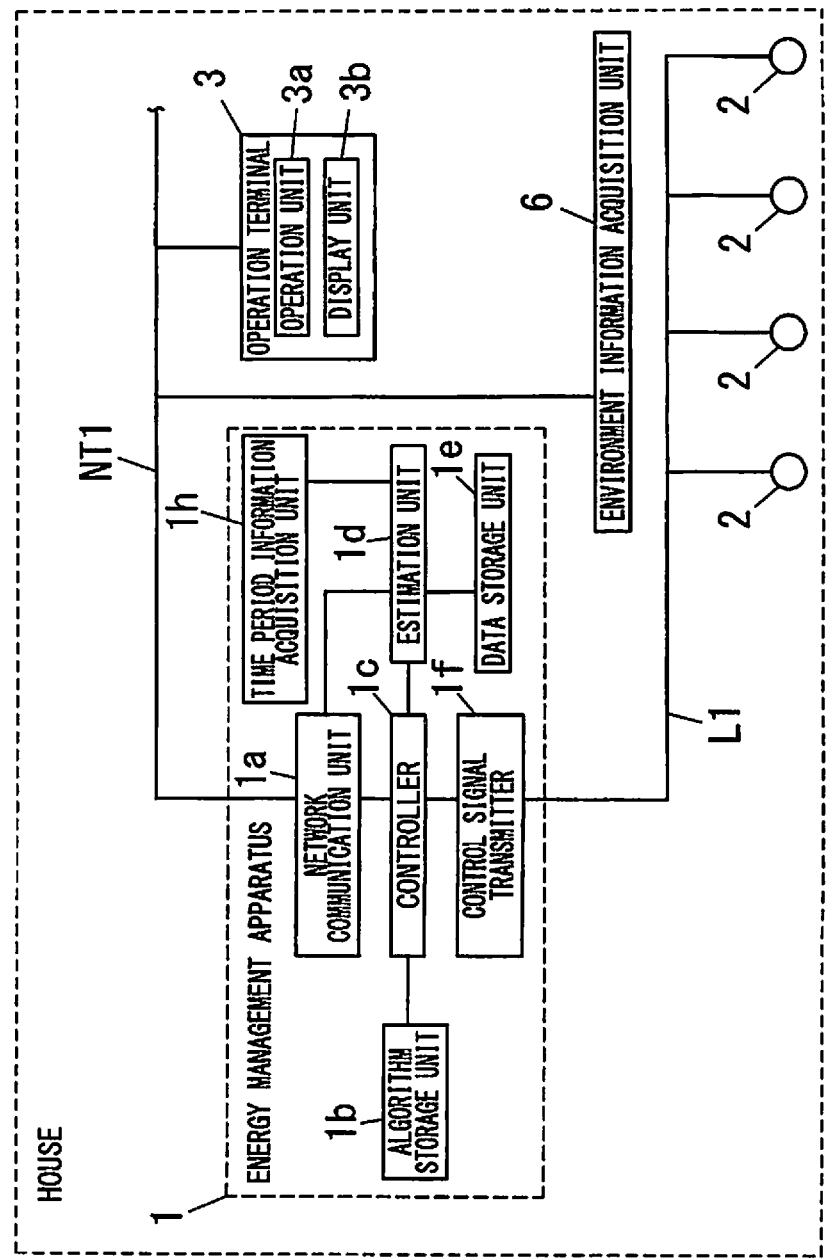
FIG. 14 is a block diagram illustrating an energy management system according to Embodiment 6.

FIG. 14 illustrates a configuration of an energy management system which uses energy management apparatus 1 according to Embodiment 6. The same reference numeral is applied to the configuration similar to that of Embodiment 1, and an explanation thereof is omitted.

Firstly, the system further included environment information acquisition unit 6 configured to acquire environment information which is information on environments of the inside and the outside of a house. Environment information acquisition unit 6 is connected to in-home network NT1, and is configured to acquire outside air temperature data which is a measurement result of the temperature outside of the individual house (outside air temperature), and transmit the outside air temperature data to energy management apparatus 1. The outside air temperature is equivalent to environment information in the invention.

Figures 15, 16:
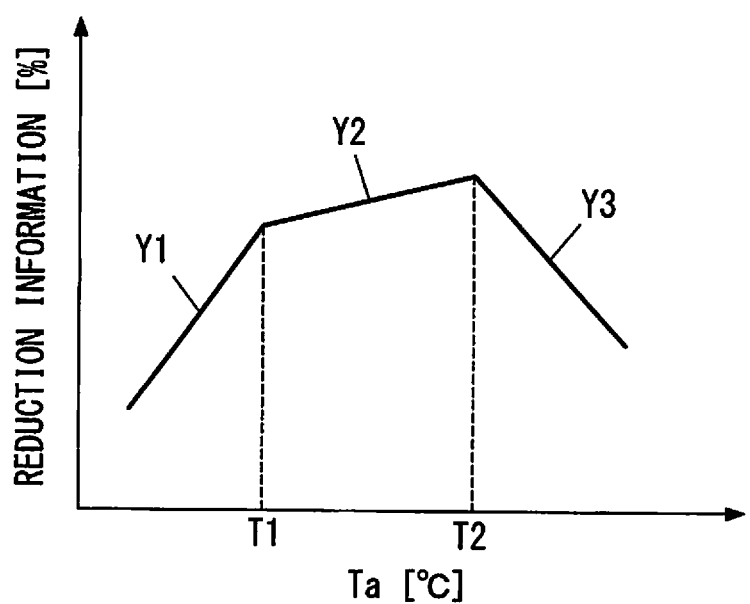
FIG. 15 is a table view illustrating reduction information in the same embodiment.
FIG. 16 is a graph illustrating reduction information in the same embodiment.

In addition, data storage unit 1e of energy management apparatus 1 stores table TB3 as illustrated in FIG. 15, in which reduction information K1 corresponding to each second algorithm is set for every range of outside air temperature Ta. For example, as illustrated in FIG. 16, reduction information K1 on second algorithm M1 increases with a large gradient when outside air temperature Ta≤T1 is satisfied, as outside air temperature Ta is raised (K1=Y1). Moreover, reduction information K1 on second algorithm M1 increases with a small gradient when T1<outside air temperature Ta≤T2 is satisfied, as outside air temperature Ta is raised (K1=Y2). Moreover, reduction information K1 on second algorithm M1 decreases when outside air temperature Ta>T2, as outside air temperature Ta is raised (K1=Y3).

Further, when figuring out the reduction (energy-saving effect) in the consumed-power amount due to the execution of the second algorithm, estimation unit 1d refers to data storage unit 1e to select reduction information K1 corresponding to outside air temperature Ta under the second control, and estimates the energy-saving effect using reduction information K1. In other words, use of reduction information K1 suitable for outside air temperature Ta under the second control leads to improvement in the estimation accuracy of the energy-saving effect. Note that, although the embodiment uses the outside air temperature as environment information, information on an outside environment such as the humidity or the like outside the house may be used as environment information.

Moreover, as illustrated in FIG. 14, energy management apparatus 1 may further include time period information acquisition unit 1h configured to have a calendar function and acquire time period information such as the season, the time, or the like.

In this case, data storage unit 1e of energy management apparatus 1 stores table TB4 illustrated in FIG. 17, and reduction information K1 corresponding to each of second algorithms is set for every season in table TB4.

Further, when figuring out the reduction (energy-saving effect) in the consumed-power amount due to the execution of the second algorithm, estimation unit 1d refers to data storage unit 1e to select reduction information K1 corresponding to season reduction information K1, and estimates the energy-saving effect using reduction information K1. For example, reduction information K1 of second algorithm M1 is set to, reduction information K1=Y11 in the summer, reduction information K1=Y13 in the winter, and reduction information K1=Y12 in the intermediate seasons between the summer and the winter. In other words, the use of reduction information K1 suitable for the season under the second control leads to improvement in the estimation accuracy of the energy-saving effect.

Moreover, data storage unit 1e of energy management apparatus 1 may store table TB5 illustrated in FIG. 18, and reduction information K1 corresponding to each of second algorithms is set for every weather and for every time in table TB5. In this case, environment information acquisition unit 6 acquires weather data on the weather in an area where the house is located, and transmits the weather data to energy management apparatus 1. The weather is equivalent to environment information in at least one embodiment of the invention.

In addition, estimation unit 1d can determine the present time (morning, day time, night) in accordance with time period information acquired by time period information acquisition unit 1h.

Further, when determining the reduction (energy-saving effect) in the consumed-power amount due to the execution of the second algorithm, estimation unit 1d refers to data storage unit 1e to select reduction information K1 corresponding to the weather and the time, and estimates the energy-saving effect using reduction information K1. In other words, because reduction information K1 suitable for the weather and the time under the second control is used, the estimation accuracy of the energy-saving effect is improved.

Note that, even in Embodiments 2 to 5, the similar effect can be exhibited with the similar configuration in the embodiment. Moreover, in the abovementioned embodiments, anything such as a gas, heat, or water, other than the electric power may be used in place of the energy consumed by controlled device 2.

Note that, as operation terminal 3, mobile terminal connectable to in-home network NT1 via Internet NT2 may be used. Moreover, a network-compatible television or a dedicated terminal which is installed in an in-home and connected to in-home network NT1 may be used as operation terminal 3.

Although the several preferred embodiments of the invention are described, the invention can be variously altered and modified by a person skilled in the art without departing from the original spirit and the scope of the invention, that is exemplified by the following set of claims.

The invention claimed is:

1. An energy management apparatus, comprising:
   an algorithm storage unit configured to store at least one energy-saving control algorithm, which controls an operation of a controlled device in a way to reduce energy consumption thereof;
   a controller configured to control the operation of the controlled device by executing the energy-saving control algorithm;
   a data storage unit configured to store reduction information corresponding to the energy-saving control algorithm, and used to figure out a reduction in the energy consumption of the controlled device due to the execution of the energy-saving control algorithm;
   an estimation unit configured to estimate, when the controller controls the operation of the controlled device by executing the energy-saving control algorithm, the reduction in the energy consumption of the controlled device due to the execution of the energy-saving control algorithm on the basis of the reduction information corresponding to the energy-saving control algorithm; and
   an output unit configured to output an estimation result by the estimation unit.

2. The energy management apparatus according to claim 1, wherein
   the algorithm storage unit is configured to store energy-saving control algorithms each of which controls the operation of the controlled device in a way to reduce the energy consumption thereof,
   the controller is configured to control the operation of the controlled device by executing the energy-saving control algorithm selected from the algorithm storage unit, and
   the data storage unit is configured to store reduction information corresponding to each of the energy-saving control algorithms, wherein the reduction information is used to figure out a reduction in the energy consumption of the controlled device due to the execution of the corresponding energy-saving control algorithm.

3. The energy management apparatus according to claim 2, wherein the estimation unit is configured to acquire an execution duration which is a period when the energy-saving control algorithm is continuously executed, and estimate the reduction in the energy consumption of the controlled device on the basis of the acquired execution duration and the reduction information corresponding to the energy-saving control algorithm.

4. The energy management apparatus according to claim 3, wherein the estimation unit is configured to estimate the reduction in the energy consumption of the controlled device in the execution duration when the time length of the execution duration is not less than a lower limit value, and not to estimate the reduction in the energy consumption of the controlled device in the execution duration when the time length of the execution duration is less than the lower limit value.

5. The energy management apparatus according to claim 2, further comprising an update unit configured to update the reduction information corresponding to an executed energy-saving control algorithm and stored in the data storage unit on the basis of measurement results of the energy consumption of the controlled device before and after the controller starts executing of the energy-saving control algorithm.

6. The energy management apparatus according to claim 5, further comprising a time period information acquisition unit configured to acquire time period information on a time period, wherein
the data storage unit is configured to store reduction information corresponding to each of the energy-saving control algorithms for every time period, and
the estimation unit is configured to estimate the reduction in the energy consumption of the controlled device, on the basis of the reduction information for the time period information acquired by the time period information acquisition unit.

7. The energy management apparatus according to claim 5, wherein
the energy management apparatus constitutes an energy management system with an environment information acquisition unit configured to acquire environment information on a surrounding environment,
the data storage unit is configured to store reduction information corresponding to each of the energy-saving control algorithms for every surrounding environment, and
the estimation unit is configured to estimate the reduction in the energy consumption of the controlled device on the basis of the reduction information for the environment information acquired by the environment information acquisition unit.

8. The energy management apparatus according to claim 2, further comprising a time period information acquisition unit configured to acquire time period information on a time period, wherein
the data storage unit is configured to store reduction information corresponding to each of the energy-saving control algorithms for every time period, and
the estimation unit is configured to estimate the reduction in the energy consumption of the controlled device on the basis of the reduction information for the time period information acquired by the time period information acquisition unit.

9. The energy management apparatus according to claim 8, wherein
the energy management apparatus constitutes an energy management system with environment information acquisition unit configured to acquire environment information on a surrounding environment,
the data storage unit is configured to store reduction information corresponding to each of the energy-saving control algorithms for every surrounding environment,
the estimation unit is configured to estimate the reduction in the energy consumption of the controlled device on the basis of the reduction information corresponding to the environment information acquired by the environment information acquisition unit.

10. The energy management apparatus according to claim 2, wherein
the energy management apparatus constitutes an energy management system together with an environment information acquisition unit configured to acquire environment information on a surrounding environment,
the data storage unit is configured to store reduction information corresponding to each of the energy-saving control algorithms for every surrounding environment, and
the estimation unit is configured to estimate the reduction in the energy consumption of the controlled device on the basis of the reduction information for the environment information acquired by the environment information acquisition unit.

11. The energy management apparatus according to claim 1, wherein
the controller is configured to control the operation of the controlled device by executing a first algorithm under which the controlled device is operated at a predetermined output level, and
the at least one energy-saving control algorithm is a second algorithm under which the controlled device is operated with energy consumption smaller than the energy consumption of the controlled device under the first algorithm.

12. The energy management apparatus according to claim 1, wherein the reduction information indicates a ratio of a consumed-power amount reduced due to the execution of the energy-saving control algorithm in a case where the energy-saving control algorithm is executed on the controlled devices, with respect to a total consumed-power amount of the controlled device.

13. An energy management system, comprising:
energy management apparatuses and
a central server configured to be able to communicate with each of the energy management apparatuses, wherein
each of the energy management apparatuses, comprises:
an algorithm storage unit configured to store energy-saving control algorithms, each of which controls an operation of a controlled device in a way to reduce energy consumption thereof;
a controller configured to control the operation of the controlled device by executing the energy-saving control algorithm selected from the algorithm storage unit,;
a data storage unit configured to store reduction information corresponding to each of the energy-saving control algorithms, wherein the reduction information is used to figure out a reduction in the energy consumption of the controlled device due to the execution of the corresponding energy-saving control algorithm;
an estimation unit configured to estimate, when the controller controls the operation of the controlled device by executing the energy-saving control algorithm, the reduction in the energy consumption of the controlled device due to the execution of the energy-saving control algorithm on the basis of the reduction information corresponding to the energy-saving control algorithm; and an output unit configured to output an estimation result by the estimation unit.

14. The energy management system according to claim 13, wherein each of the energy management apparatuses is configured to send the central server the reduction information stored in the data storage unit corresponding to each of the energy-saving control algorithms, the central server is configured to statistically process the reduction information received from the energy management apparatuses for each corresponding energy-saving control algorithm, and each of the energy management apparatuses is configured to update the corresponding reduction information stored in the data storage unit on the basis of the reduction information after the statistical processing acquired from the central server.

15. The energy management system according to claim 14, wherein the central server is configured to statistically process reduction information received from each of the energy management apparatuses on the basis of an attribute assigned to each of the energy management apparatuses, and each of the energy management apparatuses is configured to acquire the reduction information after the statistical processing corresponding to the attribute assigned thereto from the central server.

16. The energy management system according to claim 13, wherein the central server is configured to statistically process reduction information received from the energy management apparatuses on the basis of attribute assigned to each of the energy management apparatuses, and each of the energy management apparatuses is configured to acquire the reduction information after the statistical processing corresponding to the attribute assigned thereto from the central server.

17. An energy management method, comprising:

storing at least one energy-saving control algorithm, which controls an operation of a controlled device in a way to reduce energy consumption thereof;

controlling the operation of the controlled device by executing the energy-saving control algorithm;

storing reduction information corresponding to the energy-saving control algorithm, and used to figure out a reduction in the energy consumption of the controlled device due to the execution of the energy-saving control algorithm;

estimating, when the operation of the controlled device is controlled by executing the energy-saving control algorithm, the reduction in the energy consumption of the controlled device due to the execution of the energy-saving control algorithm on the basis of the reduction information corresponding to the energy-saving control algorithm; and outputting an estimation result in accordance with the estimating.

18. The energy management method according to claim 17, wherein energy-saving control algorithms are stored, each of which controls the operation of the controlled device in a way to reduce the energy consumption thereof, the operation of the controlled device is controlled by executing the energy-saving control algorithm selected, and reduction information corresponding to each of the energy-saving control algorithms is stored, wherein the reduction information is used to figure out a reduction in the energy consumption of the controlled device due to the execution of the corresponding energy-saving control algorithm.

19. The energy management method according to claim 18, wherein the estimating acquires an execution duration which is a period when the energy-saving control algorithm is continuously executed, and estimates the reduction in the energy consumption of the controlled device on the basis of the acquired execution duration and the reduction information corresponding to the energy-saving control algorithm.

20. The energy management method according to claim 19, wherein the reduction in the energy consumption of the controlled device is estimated in the execution duration when the time length of the execution duration is not less than a lower limit value, and the reduction in the energy consumption of the controlled device is not estimated in the execution duration when the time length of the execution duration is less than the lower limit value.

21. The energy management method according to claim 20, further comprising updating the reduction information corresponding to an executed energy-saving control algorithm on the basis of measurement results of the energy consumption of the controlled device before and after the controller starts executing of the energy-saving control algorithm.

* * * * *